(12) United States Patent
Nordin et al.

(10) Patent No.: US 6,836,509 B1
(45) Date of Patent: Dec. 28, 2004

(54) DSL- COMPATIBLE POTS LINE CARD

(75) Inventors: Ronald Alex Nordin, Naperville, IL (US); Carl Robert Posthuma, Wheaton, IL (US); Paul R Sand, Woodridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 975 days.

(21) Appl. No.: 09/617,446

(22) Filed: Jul. 17, 2000

(51) Int. Cl.[7] ............................................. H04M 11/00
(52) U.S. Cl. ............... 375/220; 379/93.05; 379/399.01; 379/414
(58) Field of Search ....................... 375/222; 379/93.05, 379/93.08, 93.26, 93.28, 93.37, 90.01, 93.01, 399.01, 414

(56) References Cited

U.S. PATENT DOCUMENTS

| | | | |
|---|---|---|---|
| 5,802,169 A | 9/1998 | Frantz et al. | 379/398 |
| 6,067,316 A | 5/2000 | Amrany et al. | 375/220 |
| 6,295,343 B1 * | 9/2001 | Hjartarson et al. | 379/93.05 |
| 2003/0156632 A1 * | 8/2003 | Dowling | 375/222 |

FOREIGN PATENT DOCUMENTS

| | | |
|---|---|---|
| DE | 197 25 572 A 1 | 1/1999 |
| EP | 0 503 528 A2 | 9/1982 |

OTHER PUBLICATIONS

EPO Search Report; No. EP 01 30 0758; dated Jan. 25, 2002; Examiner M. Vandevenne; place of search, The Hague.
U.S. patent application Ser. No. 08/767,138, Nye et al., filed May 22, 2000.

* cited by examiner

Primary Examiner—Amanda T. Le

(57) ABSTRACT

An improved plain old telephone service (POTS) line card that may be directly connected to a customer line that is also connected to a digital subscriber line access module. A second order filter is added to the front end of the POTS line card in order to attenuate XDSL signals and to lower its amplitude. A new digital signal processor (DSP) includes further low pass filtering functions, gain compensation, termination impedance compensation and balance network compensation to provide the proper balanced network as is known in current POTS cards but not provided in current XDSL services. This card may also be used alone, without a XDSL equipped line.

21 Claims, 3 Drawing Sheets

DSL- COMPATIBLE POTS LINE CARD

FIELD OF THE INVENTION

This invention relates to telephone switching systems and to high-speed data communications, and, more specifically to a line card for analog telephone service that is compatible with high-speed data service on the same line.

BACKGROUND OF THE INVENTION

Once upon a time, the Bell System wired almost every home and business in the United States for telephone service by one (or more) tip-ring pair of copper wires. This original physical plant provided plain old telephone service ("POTS"). As time passed, more and more features and services were offered over the same copper wire. The tip-ring pair was originally intended for voice-band service of between (approximately) 0 and 4 kHz. This rather narrow bandwidth (by today's standards) provides high-quality voice communication and high quality in-band communication in general, i.e., dual tone multifrequency (DTMF) signaling. In more recent times, however, home and business use of computers (and data transmission in general) has taxed this tip-ring infrastructure to the maximum amount of data that can be passed through the voiceband (approximately 53 kbps). Consumers, especially business consumers, are demanding greater data rates. Several new technologies have been tried in an attempt to fulfill this demand. Coaxial cable and optical fiber have been tried, both of which have much higher bandwidth than copper wire. The one major drawback to both is that, unlike the copper wire infrastructure, there is no universal cable or optical infrastructure.

One relatively new technology that can be implemented over the embedded copper networks is digital subscriber line (DSL). DSL comes in many varieties such as asymmetrical DSL (ADSL) (upstream and downstream have different bandwidth requirements) and other varieties of service (herein XDSL). Many XDSL technologies provide high speed data service over current tip-ring pairs by encoding the signals in frequency ranges above the POTS frequency. Thus, one tip-ring pair can provide both POTS service and high-speed data service.

The local service providers (who are no longer part of a universal Bell System), however, have to make major changes in their central office to provide XDSL service. FIG. 1 is a block diagram of a current central office providing XDSL service. Central office 10 includes a local telephone switching system (switch) 12 that provides the usual POTS telephone services and features. In order to provide XDSL, central office 10 also includes digital subscriber line access multiplexer (DSLAM) 14 which sends and receives digital signals to and from the subscribers and intefaces to the digital network 16. A main distribution frame 20, as is known in the art, connects outside plant tip-ring pairs 22 to switch 12 and DSLAM 16.

In order to serve both a POTS telephone and XDSL on one tip-ring pair 22, a splitter 24 is required. Splitter 24, in general, causes the XDSL signal to be sent towards the DSLAM 16 and the POTS signal to be sent towards local switching system 12. More specifically, splitter 24 includes a $4^{th}$ to $6^{th}$ order low pass filter 28. A connection 30 is made to the incoming tip-ring pair and rerouted back through MDF 20 to DSLAM 16 at XDSL line card 32 for providing XDSL services. The POTS connection passes through the low pass filter 28 and then back through MDF 20 to POTS line card 36 in local switching system 12. Splitter 24, and more specifically low pass filter 28, are required in order to filter the high frequency signal used by XDSL from the POTS circuit so that POTS line card 36 may process the incoming (and outgoing) signal properly. Furthermore, and more importantly, XDSL has a higher voltage (approximately 18 volts peak to peak) as opposed to POTS 3 to 5 volts peak to peak. Therefore, the low pass filter is also required to reduce the voltage sent to POTS line card 36 so that the line card is not damaged due to over voltage. The opposite is not true of XDSL line card 32, in that the POTS communication is so far outside of its frequency band and of such low voltage that such signals require minimal filtering and are taken care of by normal XDSL analog interfaces.

Several issues arise when splitter 24 is introduced into central office 10. Splitter 24 takes up office space, which is increasingly at a premium as new DSLAMs 16 and other services are incorporated into central office 10. Furthermore, wiring in the office becomes more complex. Wherein an original POTS line passed through MDF 20 directly to POTS line card 36, in order to provide XDSL service, the wiring passes through MDF at least three times for distribution of the various signals. In some instances, splitter 24 may be a part of the DSLAM 16 and separate wires run to switch 12 in some cases bypassing MDF 20. This scenario, however, further complicates the wiring distribution in the office and is generally avoided. In either example, if the POTS line card 36 or the XDSL line card 32 (and switch 12 and DSLAM 16 respectively) malfunction, it may affect the other equipment, and the attached subscriber can use neither the POTS telephone nor the DSL service.

In U.S. patent application Ser. No. 08/767,138, entitled "Telecommunication Equipment Support Of High Speed Data Services" which is assigned to the assignee of this invention, a new line card is disclosed that incorporates both POTS and DSL service. This is a superior solution to the above-described problem provided that switch 12 switches both POTS and XDSL service. Furthermore, many data service providers that are not the incumbent POTS service provider want to provide XDSL service. This requires that a DSLAM of the alternate service provider be connected to the switch in some manner, such as that shown in FIG. 1.

Therefore, there is a need in the art for a system that does not require additional equipment in order to provide XDSL service over POTS telephone lines.

SUMMARY OF THE INVENTION

This problem is solved and a technical advance is achieved in the art by an improved plain old telephone service (POTS) line card that may be directly connected to a customer line that is also connected to a digital subscriber line access multiplexer. A second order filter is added to the front end of the POTS line card in order to attenuate XDSL signals and to lower its amplitude. A new digital signal processor (DSP) includes further low pass filtering functions, gain compensation and termination impedance compensation to provide the proper balanced network as is known in current POTS cards but not provided in current XDSL services. This card may also be used alone without a XDSL equipped line. Thus, if the line is XDSL equipped maintenance may be performed on one without affecting the other of the two services. Further, these cards may be used in areas wherein DSL service is likely to be added as a feature and/or in areas with alternative XDSL providers.

BRIEF DESCRIPTION OF THE DRAWINGS

A more complete understanding of the invention may be obtained from a consideration of the following description, taken in conjunction with the drawings, in which.

DETAILED DESCRIPTION

Figure 1:
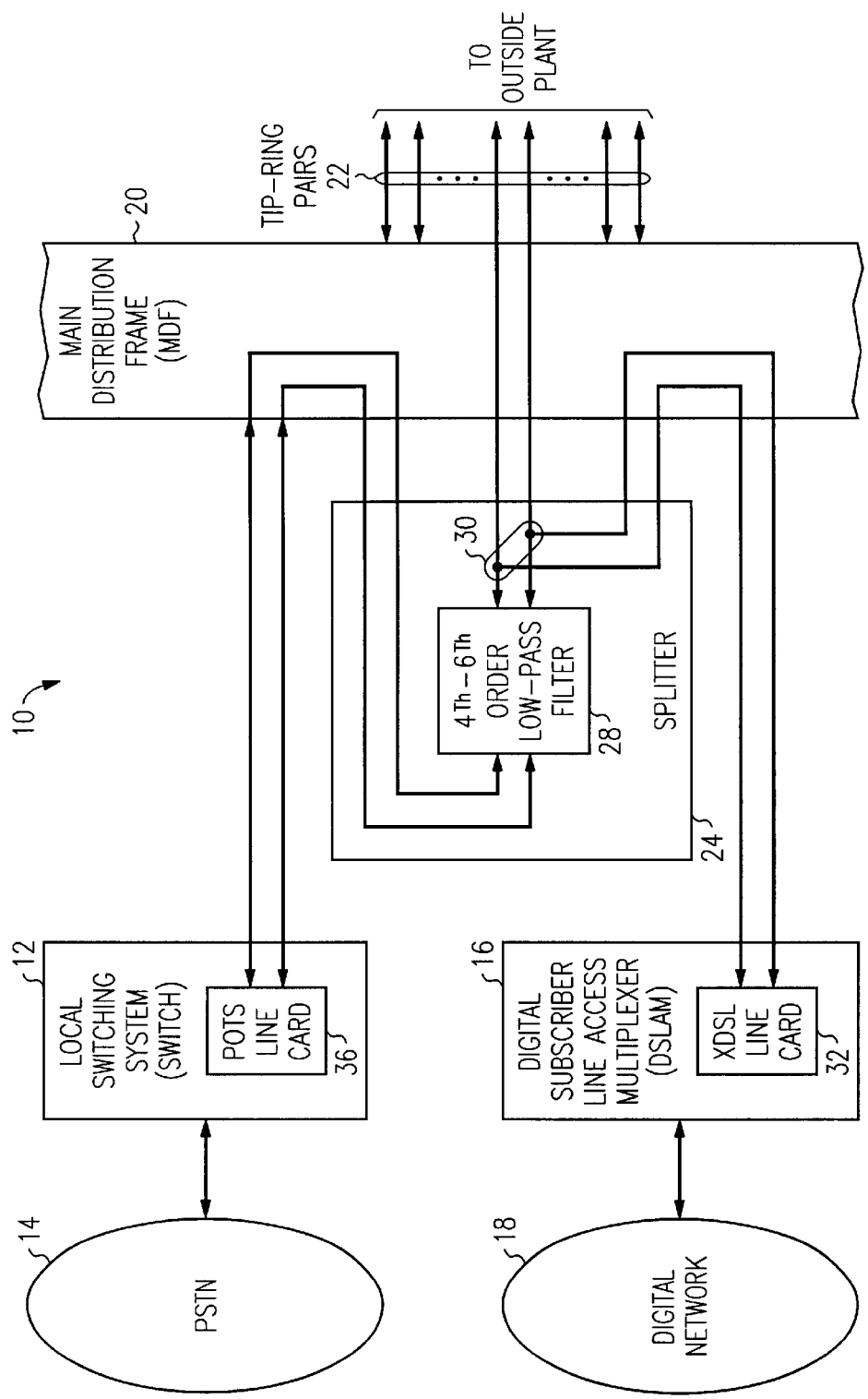
FIG. 1 is a block diagram of a prior art central office wherein XDSL is provided.
Figure 2:
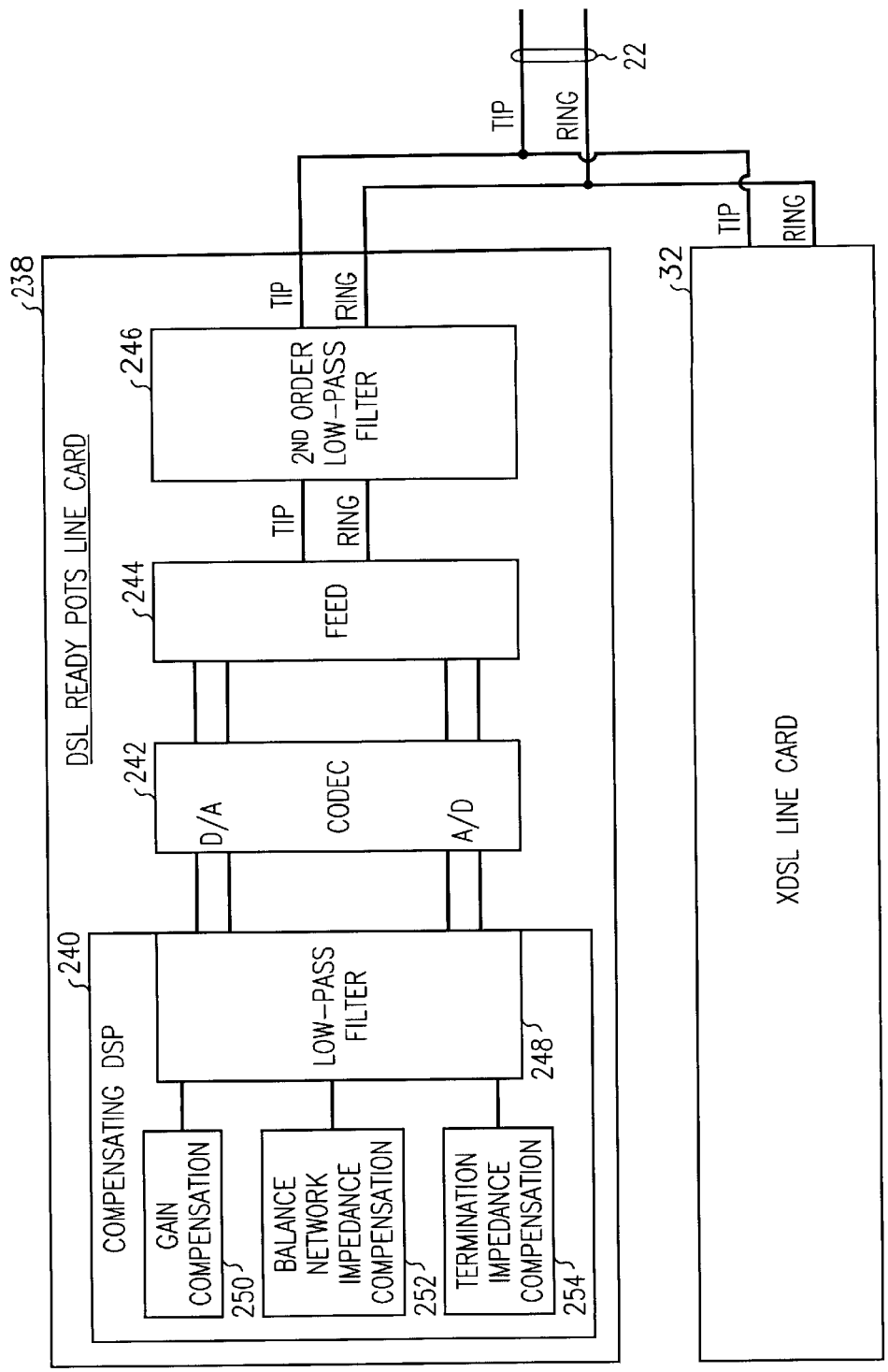
FIG. 2 is a block diagram of a DSL-ready line card according to this invention, connected to an XDSL line card.

FIG. 2 is a block diagram of a XDSL-ready POTS line card 238 connected to an XDSL line card 32, according to an exemplary embodiment of this invention. A tip-ring pair 22 arrives in the central office (10, FIG. 1) from a subscriber and is directly connected to both the XDSL-ready POTS line card and the XDSL line card. Because the XDSL-ready POTS line card does not require special wiring or separate filtering according to this exemplary embodiment, it does not matter how the two are connected through the office.

The DSL-compatible POTS line card comprises four main components, as opposed to the three main components of a current POTS line card. According to this exemplary embodiment, DSL ready POTS line card 238 comprises a compensating digital signal processor 240, a CODEC or digital/analog analog/digital converter 242 and a battery feed 244. In addition, a second-order low-pass filter is added 246. The second order filter provides some of the functions of the $4^{th}$ to $6^{th}$ order filter found in splitter 24 (FIG. 1), in that it provides attenuation of the signal but more importantly lowers the amplitude of the DSL signal from 18 volts peak to peak to between three and five volts peak to peak. In this manner, the signal and voltage is attenuated to that expected by a POTS line card. Conversely, the amplitude attenuation will not affect straight POTS service when no XDSL signal is present, because the filter does not affect the POTS bandwidth.

According to this exemplary embodiment, the compensating DSP 240 provides four further functions to its normal or known functions. DSP also provides a second order low pass filter 248 to further attenuate voltage and to ensure that the amplitude of the signal is appropriate for the POTS. The compensating DSP 240 further includes gain compensator 250 to restore any signal in the voiceband (0 to 4 kHz) that may have been attenuated by either of the two low pass filters. This restores some signal that is lost from the nature of filtering in general. However, in the prior art with the $4^{th}$ to $6^{th}$ order filters, there is no gain compensation sent to the POTS line card. Thus, this invention provides a restoration of POTS performance when used in conjunction with XDSL.

There is a balance network impedance compensator 252 in the compensating DSP 240 to bring the balanced network into conformity with 800 ohms in parallel with (100 ohms, +0.05 $\mu$F) standard non-loaded balance network. These functions are not accounted for in the current XDSL art. Therefore, in addition to providing a POTS card that may be used with or without a XDSL connection, this invention provides recovery of specifications or conforms POTS to former specifications that were not achievable with prior XDSL connections.

Figure 3:
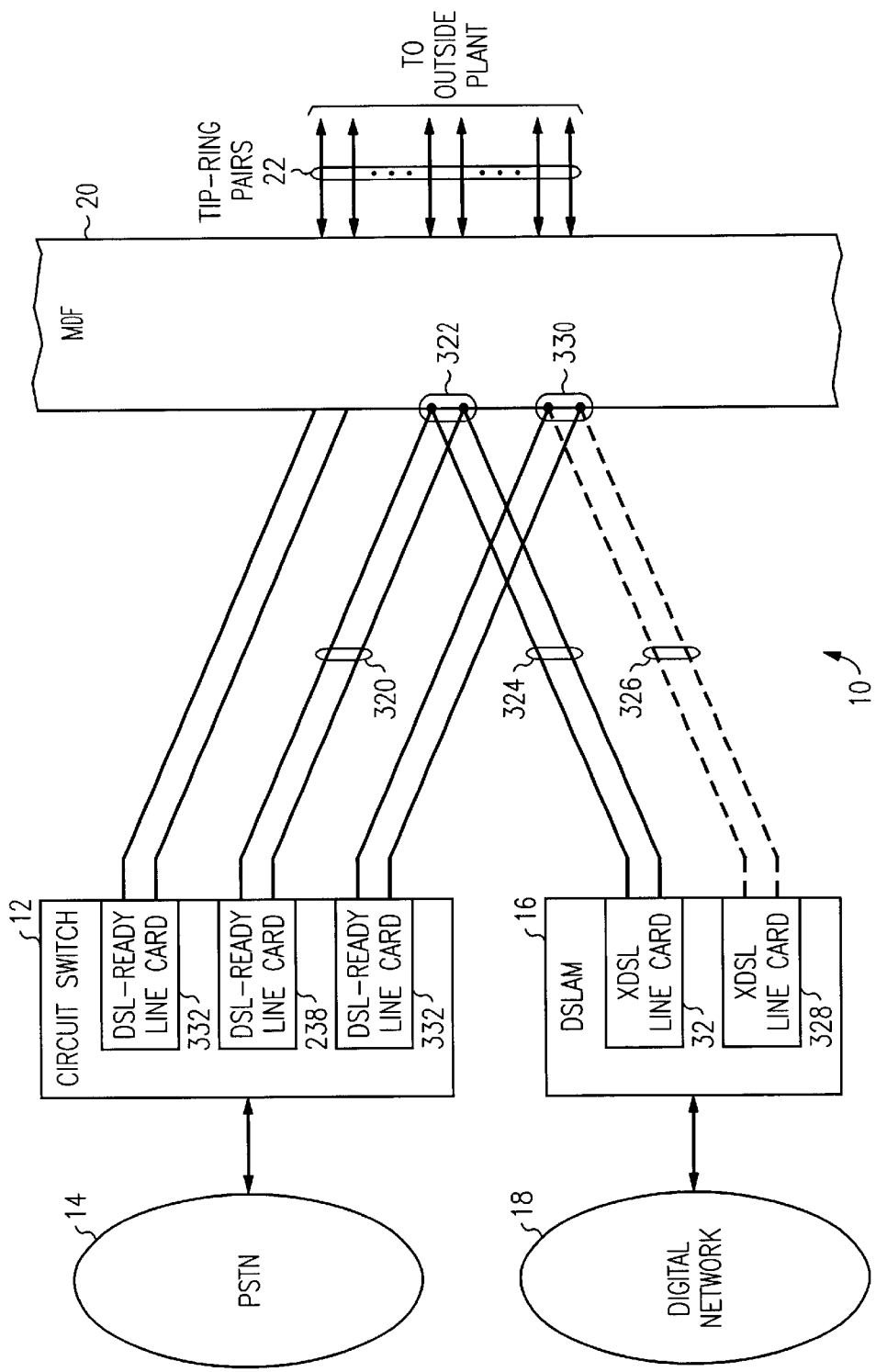
FIG. 3 is an exemplary embodiment of a switching system employing a DSL-ready line card of FIG. 2.

FIG. 3 illustrates one switching office 10 wiring scenario that is possible according to this invention. Tip-ring pairs 22 arrive from outside plant as described previously and are distributed through MDF 20. Instead of passing through a splitter, i.e., 24 of FIG. 1, the tip-ring pair 320 previously in existence for a particular subscriber is merely tapped 322 at the MDF 20 and a tip-ring pair 324 is connected from MDF 20 to XDSL line card 32 in the DSLAM 16. In this exemplary embodiment, when a new subscriber subscribes to XDSL, a line 326, shown in phantom, is merely connected from a further XDSL line card 328 to the point 330 in the main distribution frame 20 where the subscriber's line card is already connected. However, a line card 332 according to this invention may be used without modification to provide POTS service where XDSL service is not desired by the subscriber.

It is to be understood that the above-described embodiment is merely an illustrative principle of the invention and that many variations may be devised by those skilled in the art without departing from the scope of the invention. It is, therefore, intended that such variations be included within the scope of the claims.

What is claimed is:

1. A digital subscriber line (DSL) compatible plain old telephone service (POTS) line card that interfaces a telecommunications switching system (switch) to a subscriber over a two-wire subscriber line, said line card comprising:

a low-pass filter configured to filter DSL signals connected to said subscriber line; a line support circuit connected to said low-pass filter configured to provide battery feed to said line;

a codec connected to said line support circuit configured to convert analog signals from said subscriber line to digital signals and digital signals from said switch to analog signals to said subscriber line; and a digital signal processor, connected between said codec and said switch, configured to provide an appearance of POTS termination to said subscriber line and to said switch, whether said DSL signal is present or not.

2. A DSL-compatible POTS line card in accordance with claim 1 wherein said low-pass filter comprises a second-order low-pass filter.

3. A DSL-compatible POTS line card in accordance with claim 1 wherein said DSL includes a further low-pass filter configured to filter residual DSL signals.

4. A DSL-compatible POTS line card in accordance with claim 3 wherein said further low-pass filter comprises a second-order low-pass filter.

5. A DSL-compatible POTS line card in accordance with claim 1 wherein said DSP includes a gain compensator configured to compensate for said low-pass filter attenuation in POTS frequency range.

6. A DSL-compatible POTS line card in accordance with claim 1 wherein said DSP includes a balance network impedance compensator to compensate for said low-pass filter's effect on said two-wire subscriber line.

7. A DSL-compatible POTS line card in accordance with claim 1 wherein said DSP includes a termination impedance compensator to compensate for said low-pass filter's effect on said two-wire subscriber line.

8. A method for use in a POTS line card that interfaces a two-wire subscriber line to a telecommunications system so that the POTS line card maybe uses whether or not a the two-wire subscriber line also carries DSL, said method comprising the steps of:

filtering DSL signals from said subscriber line;

providing battery feed to said line;

converting analog signals from said subscriber line to digital signals and digital signals from said switch to analog signals to said subscriber line; and processing said digital signal as an appearance of a POTS termination to said subscriber line and to said switch, whether said DSL signal is present or not.

9. The method of claim 8 wherein the step of filtering comprises attenuating DSL signals in a predefined frequency range.

10. The method of claim 9 wherein the step of filtering further comprises attenuating DSL signal voltage levels.

11. The method of claim 9 wherein said predefined frequency range is above 5 kHz.

12. The method of claim 8 wherein said step of processing said digital signal as an appearance of a POTS termination includes further low-pass filtering.

13. The method of claim 8 wherein said step of processing said digital signal as an appearance of a POTS termination includes gain compensation to compensate for said low-pass filter attenuation in POTS frequency range.

14. The method of claim 8 wherein said step of processing said digital signal as an appearance of a POTS termination includes compensating balance network impedance to compensate for said low-pass filter's effect on said two-wire subscriber line.

15. The method of claim 8 wherein said step of processing said digital signal as an appearance of a POTS termination includes compensating termination impedance to compensate for said low-pass filter's effect on said two-wire subscriber line.

16. An improved plain old telephone service (POTS) line card to interface a telecommunications switching system (switch) to a subscriber over a two-wire subscriber line whether or not a digital subscriber line signal is present on said two-wire subscriber line, said improvement comprising:

a low-pass filter connected in series with the two-wire subscriber line and configured to filter out DSL signals coupled to said subscriber line from a separate DSL source connected at the subscriber line side of the low-pass filter; and a compensating digital signal processor configured to provide an appearance of POTS termination to said subscriber line and to said switch, whether said DSL signal is present or not.

17. An improved POTS line card in accordance with claim 16 wherein said low-pass filter comprises a second-order low-pass filter.

18. An improved POTS line card in accordance with claim 16 wherein said compensating DSL includes a further low-pass filter configured to filter residual DSL signals.

19. An improved POTS line card in accordance with claim 16 wherein said compensating DSP includes a gain compensator configured to compensate for said low-pass filter attenuation in POTS frequency range.

20. An improved POTS line card in accordance with claim 16 wherein said compensating DSP includes a balance network impedance compensator to compensate for said low-pass filter's effect on said two-wire subscriber line.

21. An improved POTS line card in accordance with claim 16 wherein said compensating DSP includes a termination impedance compensator to compensate for said low-pass filter's effect on said two-wire subscriber line.

* * * * *